United States Patent
Campana et al.

(10) Patent No.: US 6,203,640 B1
(45) Date of Patent: *Mar. 20, 2001

(54) MEDIUM/HEAVY DUTY MOTOR-VEHICLE TIRES PROVIDED WITH A TREAD OF THE UNIVERSAL TYPE

(75) Inventors: Luigi Campana; Alberto Carra, both of Milan (IT)

(73) Assignee: Pirelli Coordinamento Pneumatici S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 09/002,409

(22) Filed: Jan. 2, 1998

Related U.S. Application Data

(63) Continuation of application No. 08/392,162, filed on Feb. 22, 1995, now Pat. No. 5,795,415.

(30) Foreign Application Priority Data

Feb. 22, 1994 (IT) ............................................. MI94A0309

(51) Int. Cl.[7] ........................... B29D 30/00; B60C 11/12; B60C 105/00; B60C 119/00

(52) U.S. Cl. ...................... 156/110.1; 29/428; 152/209.8; 152/209.18; 152/209.21; 152/209.23; 152/209.25; 152/209.28; 152/901; 152/904; 152/DIG. 3

(58) Field of Search ............................ 152/209 R, 209 A, 152/209 D, DIG. 3, 209.2, 209.8, 209.18, 209.21, 209.23, 209.25, 209.28, 901, 904; 156/110.1; 29/428

(56) References Cited

U.S. PATENT DOCUMENTS

| | | |
|---|---|---|
| D. 261,497 | 10/1981 | Baus et al. . |
| D. 301,132 * | 5/1989 | Himuro et al. .................. D12/145 |
| 2,094,636 | 10/1937 | Bull ................................. 152/DIG. 3 |
| 2,121,955 | 6/1938 | Eger .................................. 152/209 R |

(List continued on next page.)

FOREIGN PATENT DOCUMENTS

| | | |
|---|---|---|
| 5407279 | 6/1980 | (AU) . |
| 9005029 | 7/1990 | (DE) . |
| 905030 | 8/1990 | (DE) . |
| 9206716 | 2/1993 | (DE) . |

(List continued on next page.)

OTHER PUBLICATIONS

Picture of MXT tire from Michelin Catalogue, 1992.
Picture of MAX 380 tire from Uniroyal Catalogue, 1990.
Woods, E.C., Pneumatic Tyre Design, pp. 8–25, 1955.
Toyo advertisement of May 1991.
Continental advertisement of 1990.

(List continued on next page.)

Primary Examiner—Steven D. Maki
(74) Attorney, Agent, or Firm—Stevens, Davis, Miller & Mosher, LLP

(57) ABSTRACT

A tire tread band for medium/heavy duty motor-vehicles having circumferential grooves confining three pairs of respectively center, intermediate and shoulder ribs. Respective tread blocks are defined along the center and intermediate ribs and they are confined by transverse cuts. The center cuts impart a cusp-shaped end conformation and a hollow-shaped end conformation to the respective blocks, and the shapes of said end portions mutually match. The intermediate cuts run in the linear extension of the center cuts to give the respective blocks a rhomboidal configuration. The tire can be alternately associated with a driving axle or a driven axle, by merely reversing its direction of rotation, so that the following results are selectively achieved: an increase in the traction capability by the intermediate blocks or an increase in the directional capability as a result of the mutual wedging between the center blocks at the ground-contacting area.

28 Claims, 2 Drawing Sheets

U.S. PATENT DOCUMENTS

| | | | | |
|---|---|---|---|---|
| 2,821,231 | * | 1/1958 | Kraft | 152/DIG. 3 |
| 2,926,715 | | 3/1960 | Constantakis | 152/209 R |
| 4,057,089 | | 11/1977 | Johannsen . | |
| 4,298,046 | | 11/1981 | Herbelleau et al. | 152/209 D |
| 4,299,264 | | 11/1981 | Williams . | |
| 4,424,843 | | 1/1984 | Fontaine et al. . | |
| 4,700,762 | | 10/1987 | Landers . | |
| 4,865,101 | * | 9/1989 | Williams | 152/209 R |
| 4,936,364 | | 6/1990 | Kajiwara et al. . | |
| 4,953,604 | | 9/1990 | Shepler et al. . | |
| 4,986,325 | * | 1/1991 | Matsumoto | 152/DIG. 3 |
| 5,152,852 | * | 10/1992 | Hisamichi et al. | 152/209 R |
| 5,234,042 | | 8/1993 | Kuhr et al. . | |
| 5,287,905 | | 2/1994 | Caretta et al. . | |
| 5,337,815 | * | 8/1994 | Graas | 152/209 R |
| 5,421,389 | * | 6/1995 | Favre et al. | 152/209 R |
| 5,423,364 | | 6/1995 | Himuro . | |
| 5,526,860 | | 6/1996 | Minami . | |
| 5,795,415 | * | 8/1998 | Campana et al. | 152/DIG. 3 |

FOREIGN PATENT DOCUMENTS

| | | | | |
|---|---|---|---|---|
| 194069 | * | 9/1986 | (EP) | 152/209 R |
| 0384182 | | 8/1990 | (EP) . | |
| 0457233 | | 11/1991 | (EP) . | |
| 0475929 | | 3/1992 | (EP) . | |
| 0498287 | | 8/1992 | (EP) . | |
| 0565270 | | 10/1993 | (EP) . | |
| 0982784 | | 6/1951 | (FR) . | |
| 2038729 | | 7/1980 | (GB) . | |
| 2444576 | | 7/1980 | (FR) . | |
| 2093777 | | 9/1982 | (GB) . | |
| 2229974 | | 10/1990 | (GB) . | |
| 2239845 | | 7/1991 | (GB) . | |
| 2250487 | | 6/1992 | (GB) . | |
| 151966 | | 8/1985 | (JP) | 152/209 D |
| 255506 | | 12/1985 | (JP) | 152/DIG. 3 |
| 193903 | | 8/1986 | (JP) | 152/209 R |
| 263105 | | 10/1988 | (JP) | 152/209 R |
| 2-283505 | * | 11/1990 | (JP) | 152/209 R |
| 2-310108 | * | 12/1990 | (JP) | 152/209.21 |
| 0042508 | | 1/1992 | (JP) . | |
| 4193608 | | 7/1992 | (JP) . | |
| 4317805 | | 11/1992 | (JP) . | |
| 5178026 | | 7/1993 | (JP) . | |
| 5-169917 | * | 7/1993 | (JP) | 152/209.21 |
| 5229315 | | 9/1993 | (JP) . | |
| 6-40215 | | 2/1994 | (JP) . | |

OTHER PUBLICATIONS

Cooper advertisement of Jun. 1991.
Yokohama advertisement. (No Date).
First Dunlop advertisement. (No Date).
Copy of magazine page describing two Dunlop tires cited in First Dunlop advertisement. (No Date).
Bridgestone advertisement. (No Date).
Falken advertisement. (No Date).
Second Dunlop advertisement. (No Date).
Flamingo advertisement. ( No Date).
General tire advertisement. (No Date).
Third Dunlop advertisement. (No Date).
Jp 5963206 Oct. 1992 (Abstract Only)..

* cited by examiner

MEDIUM/HEAVY DUTY MOTOR-VEHICLE TIRES PROVIDED WITH A TREAD OF THE UNIVERSAL TYPE

This application is a continuation of U.S. patent application Ser. No. 08/392,162, filed Feb.22, 1995 now U.S. Pat. No. 5,795,415.

BACKGROUND OF THE INVENTION

The present invention relates to a tire tread band for medium/heavy duty motor vehicles, comprising at least one pair of circumferential shoulder ribs confined between respective side edges of the tread band and respective circumferential shoulder grooves axially spaced apart from the side edges. At least one pair of intermediate circumferential ribs is respectively confined between the shoulder grooves and corresponding intermediate circumferential grooves axially spaced apart from the shoulder grooves. At least one center rib extends circumferentially between said intermediate grooves, each of said intermediate and center ribs are divided into a plurality of respectively intermediate and center raised reliefs or blocks, which are circumferentially defined by respectively intermediate and central transverse cuts of a width lower than 1 mm.

It is known that medium/heavy duty motor vehicles, such as trucks, semi-trailers and the like are usually equipped with tires of different types on the driving and driven axles respectively, due to the different requisite behavior and operation qualities of the tires, taking into account the different conditions of use.

In particular, tires associated with the driving wheels must exhibit as the fundamental quality, a high traction capability on any type of road, in addition to excellent uneven wear resistance for achieving high tire mileage. To this end, tires are used the tread band of which is of the type provided with a plurality of blocks defined by the combination of circumferential grooves intersecting transverse grooves of a defined width, usually in the order of 5 mm, oriented according to an angle generally larger than 45° with respect to the direction of the circumferential extension thereof. The sizes and orientation of the transverse grooves greatly affect the grip action exerted by the tire on the ground in relation to the tangential efforts connected with the transmission of the motive force.

The state of the art also suggests different construction expedients to be employed on driving or tractive tires mainly in cars, for the purpose of improving the operating features thereof. For example, European Patent EP 0 498 287 discloses a tread band provided with five rows of blocks, to be respectively identified as a center row disposed on the equatorial plane of the tire, two shoulder rows disposed along the opposite side edges of the tread band, and two intermediate rows, one being interposed between a center row and each of the shoulder rows. For the purpose of improving the wear evenness of the blocks, the transverse grooves associated with the shoulder and center block rows have a given angle of incidence relative to a direction normal to the tread band surface, which angle of incidence has respectively contrary directions between the grooves of the shoulder rows and those of the center row. It is also pointed out that two opposite types of rotation are provided for in such a tread band, depending on whether the corresponding tire is mounted to a traction axle or a driven axle of the motor-vehicle, taking into account the opposite orientations of the reaction forces exchanged with the ground in the two different use situations.

Patent GB 2 093 777 discloses a tire for cars, particularly adapted to run on road-beds covered with snow, the tread band of which is divided into five circumferential ribs, identified as a center rib, a pair of intermediate ribs and a pair of shoulder ribs, integrally passed through by thin grooves and transverse cuts oriented obliquely to the circumferential direction. The grooves and cuts arranged in the intermediate and shoulder ribs have a predetermined angle of incidence relative to the normal to the external surface of the tread band, for the purpose of improving the grip action of the tread band on the road-bed when covered with snow. In order that the rolling direction of the tire will not affect the traction features thereof, it is provided that the incidence of the grooves and cuts made in one of the shoulder ribs and one of the intermediate ribs be opposite from that of the grooves and cuts belonging to the other shoulder rib and other intermediate rib.

Referring now to tires mounted on the driven axles of medium/heavy duty motor-vehicles, it is noted that the main feature required from them is a high directional control stability, together with a good abrasion resistance and wear unevenness resistance, as well as a remarkable elimination of water from the imprint or track area in case of running on a wet road-bed.

In this connection tires having a tread band of the "furrowed" type are used, that is provided with circumferential straight or zigzag grooves defining a plurality of circumferential ribs in the tread band, which ribs are optionally passed through by transverse cuts of limited width.

European Patent EP 0 384 182 discloses a tire for medium/heavy duty motor-vehicles having a tread band of the "furrowed" type, with five or more circumferential ribs confined by corresponding circumferential zigzag grooves. Each rib, apart from the shoulder ribs defining the opposite side edges of the tread band, is divided into a plurality of blocks circumferentially defined by transverse cuts less than 3 mm wide. The transverse cuts of each rib are located in a circumferentially offset position relative to those of the adjacent rib and have an angle of incidence between 50 and 25° relative to a direction normal to the external tread band surface. The rotational direction of the tire is such that on running the reactions transmitted from the ground to the ground-contacting area of the tread band tend to reduce the inclination of the transverse cuts relative to the normal to the tread band surface, for the purpose of achieving a greater wear evenness in the blocks, thereby avoiding the so-called "saw-tooth" wear phenomenon.

The foregoing being stated, due to the fact that at the present state of the art the tread band pattern adopted for traction tires and driven or free rolling tires respectively is specific for each of them, the use of one and the same type of tire for both uses on a medium/heavy duty motor-vehicle cannot be proposed.

SUMMARY OF THE INVENTION

In accordance with the present invention, it has been found that the above goal could be achieved by distinguishing in the width of a tread band, different portions particularly adapted to selectively perform directional and tractive functions and imposing contrary rotational directions to the tire for the purpose of accomplishing one or the other function, so that one and the same tire will be readily used on a tractive axle or a driven axle by merely reversing its direction of rotation.

In particular, the invention relates to a tire tread band for medium/heavy duty motor-vehicles, characterized in that the transverse center cuts define, in the axial width of the tread band, at least one directional circumferential area confined between the intermediate grooves, in which said center blocks lend themselves to be linked up one after the other by effect of elastic deformations induced therein by the reactions transmitted from the ground when the tread band rotates in a given direction of rolling, said intermediate cuts defining, at laterally opposite positions relative to the directional area, at least two tractive circumferential areas in which at least the intermediate blocks mutually diverge by effect of the elastic deformations induced by the reactions transmitted from the ground when the tread band rotates in a tractive rolling direction contrary to the directional rolling direction.

To this end the center cuts define, at circumferentially opposite positions on each center block, a cusp-shaped end portion turned in the directional rolling direction, and a hollow-shaped end portion the shape of which matches that of the cusp-shaped end portion.

The intermediate transverse cuts give each of the intermediate blocks a substantially rhomboidal configuration. In greater detail, each center cut has first and second consecutive stretches extending obliquely according to respectively opposite orientations relative to the circumferential direction of the tread band, in order to impart said cusp-shaped end conformation and said hollow-shaped end conformation to each center block, whereas the intermediate cuts are directed obliquely to the circumferential extension direction concordantly with the orientation of the adjacent stretches of the center cuts, in order to impart a substantially rhomboidal configuration to the respective intermediate blocks.

Preferably two of said center ribs are provided and they are disposed symmetrically to the equatorial plane of the tread band and mutually separated by at least one auxiliary circumferential groove.

In particular, two of said auxiliary circumferential grooves are provided and they define an auxiliary circumferential scooped portion symmetrically centered relative to said equatorial plane.

Advantageously, each of the intermediate cuts extends in the rectilinear extension of the adjacent stretch of one of the center cuts, the first stretches of the center cuts and the intermediate cuts forming an angle of inclination between 10° and 35° with the circumferential extension direction.

The second stretches of the center cuts exhibit, relative to the circumferential extension direction, an angle of inclination between 15° and 40°.

According to a further feature of the invention, the intermediate and center cuts extend obliquely in the thickness of the corresponding ribs, forming respective angles of incidence relative to a direction normal to the outer tread band surface.

Preferentially, the angle of incidence formed by each center cut is oriented so as to substantially form an undercut close to the cusp-shaped end portion of the corresponding center block, and the angle of incidence formed by the intermediate cuts is correspondingly opposite to the angle of incidence formed by the center cuts.

Advantageously, each of said angles of incidence, in a plane normal to the extension direction of said cuts on the external tread band surface has a value between 3° and 10°.

Each of said center and intermediate cuts preferentially has a width between 0.3 mm and 1.5 mm and a depth substantially corresponding to that of the adjacent circumferential grooves.

In turn, the shoulder, the intermediate and the auxiliary grooves each have a depth between 11 mm and 18 mm.

In addition, each of said shoulder, intermediate and auxiliary grooves is 2 mm to 15 mm wide on the external surface of the tread band.

Preferably, each of said shoulder grooves has an external portion opening onto the external tread band surface according to a width between 5 mm and 12 mm, as well as an internal portion of a width lower than 2 mm and having a depth in the order of from $1/8$ to $2/5$ of the overall depth of the shoulder groove itself.

In addition, each of said intermediate grooves is conceived so that its width is greater than the width of the shoulder and auxiliary grooves.

In a preferential solution, each shoulder rib has surface sipes (small cuts) running in the extension of the intermediate cuts and having a varying profile in right section and a depth not higher than 5 mm.

Finally, the center and intermediate ribs are substantially of the same width, that is between $1/11$ and $1/6$ of the overall width of the tread band.

BRIEF DESCRIPTION OF THE DRAWINGS

Further features and advantages will become more apparent from the detailed description of a preferred embodiment of a tread band for medium/heavy duty motor-vehicles in accordance with the present invention, given hereinafter by way of non-limiting example with reference to the accompanying drawings, in which.

DESCRIPTION OF A PREFERRED EMBODIMENT

Figure 1:
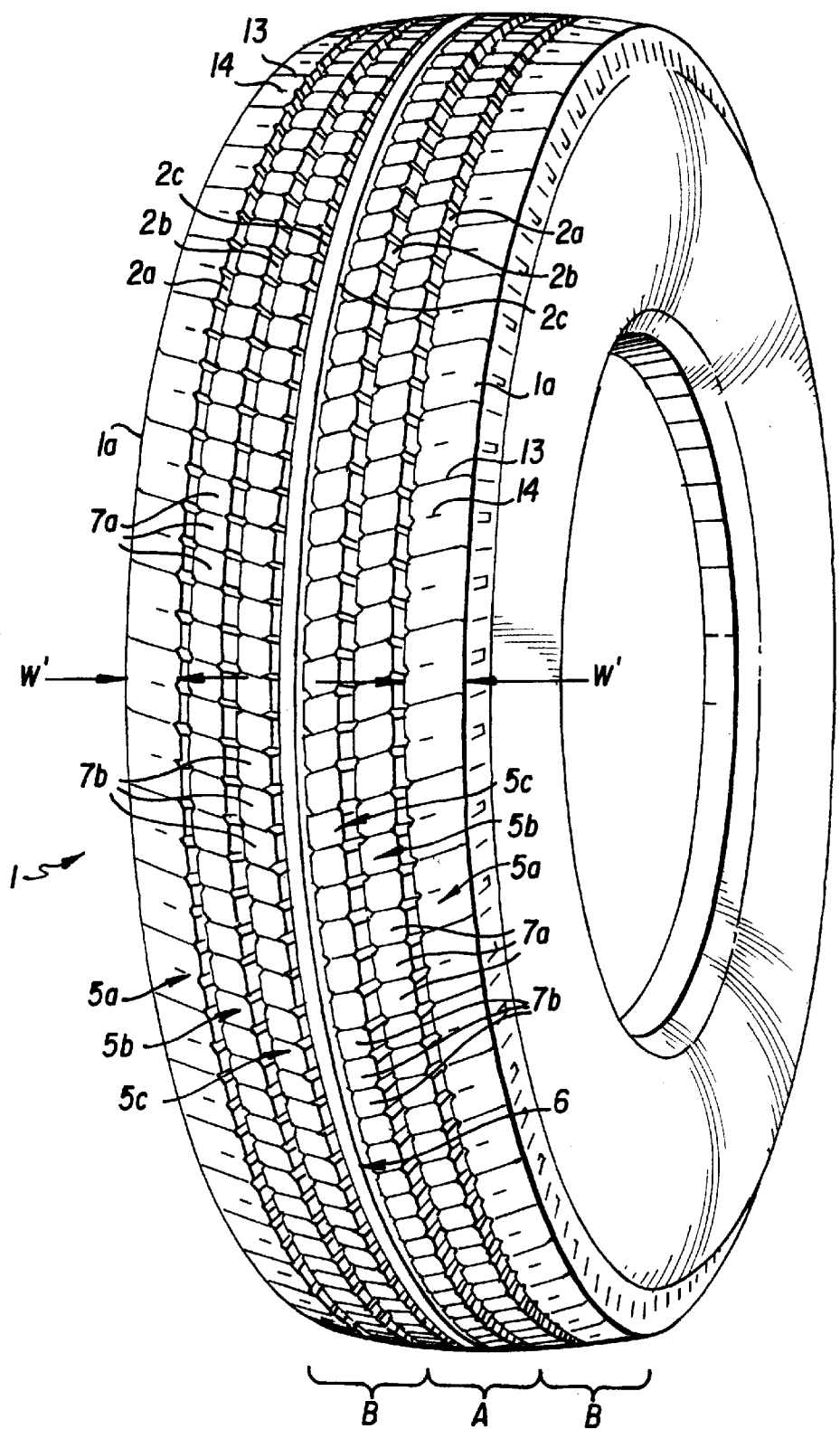
FIG. 1 is a perspective view of a tire provided with a tread band in accordance with the invention.

Referring to the drawings, a tire tread band for medium/heavy duty motor-vehicles in accordance with the present invention has been generally identified by reference numeral 1.

It is pointed out that the size parameters reproduced in the progress of the present description refer, by way of example only, to a tread band associated with a new tire size 315/80R22.5", mounted to the appropriate rim and inflated to the use pressure.

The tread band 1, associated with a tire the remaining parts of which are not described because they are known and not of importance to the ends of the invention, has a plurality of circumferential grooves 2a, 2b, 2c axially spaced apart from each other, disposed symmetrically to the equatorial plane m—m of the tread band and having, only by way of example and not limitation, a width between 2 mm and 15 mm, and a depth in the range of 11 mm to 18 mm. More particularly, provision is made for at least one pair of shoulder grooves 2a having a given width L' axially spaced apart from respective opposite side edges 1a of the tread band 1, at least one pair of intermediate grooves 2b, preferably having a width L" which is greater than that of the shoulder grooves 2a and axially spaced apart from the shoulder grooves towards the equatorial plane m—m, as well as one or more auxiliary grooves 2, of width L''' and located at a central position relative to the tread. In greater detail, said widths L', L'', L''' respectively correspond to 6.5 mm for shoulder grooves 2a, 8.5 mm for intermediate grooves 2b, and 4.5 mm for auxiliary grooves 2c, the latter preferably being two in number and disposed symmetrically to the equatorial plane m—m.

Figure 5:
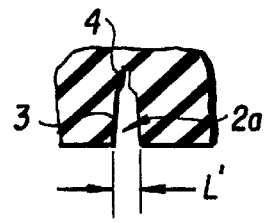
FIG. 5 is a partial sectional view taken along line V—V in FIG. 2.

As shown in FIG. 5, each of the shoulder grooves 2a has as seen in right section, an external portion 3 opening onto the outer surface of the tread band 1 according to the above description, a width L', and a radial inward portion 4 of a width less than 2 mm and a depth between ⅛ and ⅔ of the overall depth of the groove itself.

The presence of grooves 2a, 2b, 2c gives rise to a plurality of circumferential ribs 5a, 5b, 5c disposed consecutively in axial side by side relation. More particularly, provision is made for at least one pair of shoulder ribs 5a each confined between one of the side edges 1a and one of the shoulder grooves 2a, one pair of intermediate ribs 5b each confined between one of the shoulder grooves 2a and one of the intermediate grooves 2b, as well as one or more center ribs 5c confined between the intermediate grooves 2b. In the embodiment shown, a pair of center ribs 5c is provided and each of them is confined between one of the intermediate grooves 2b and one of the auxiliary grooves 2c. In addition, a continuous scooped portion 6 is defined between the auxiliary grooves 2c and it extends circumferentially at a centered position relative to the equatorial plane m—m.

Figure 2:
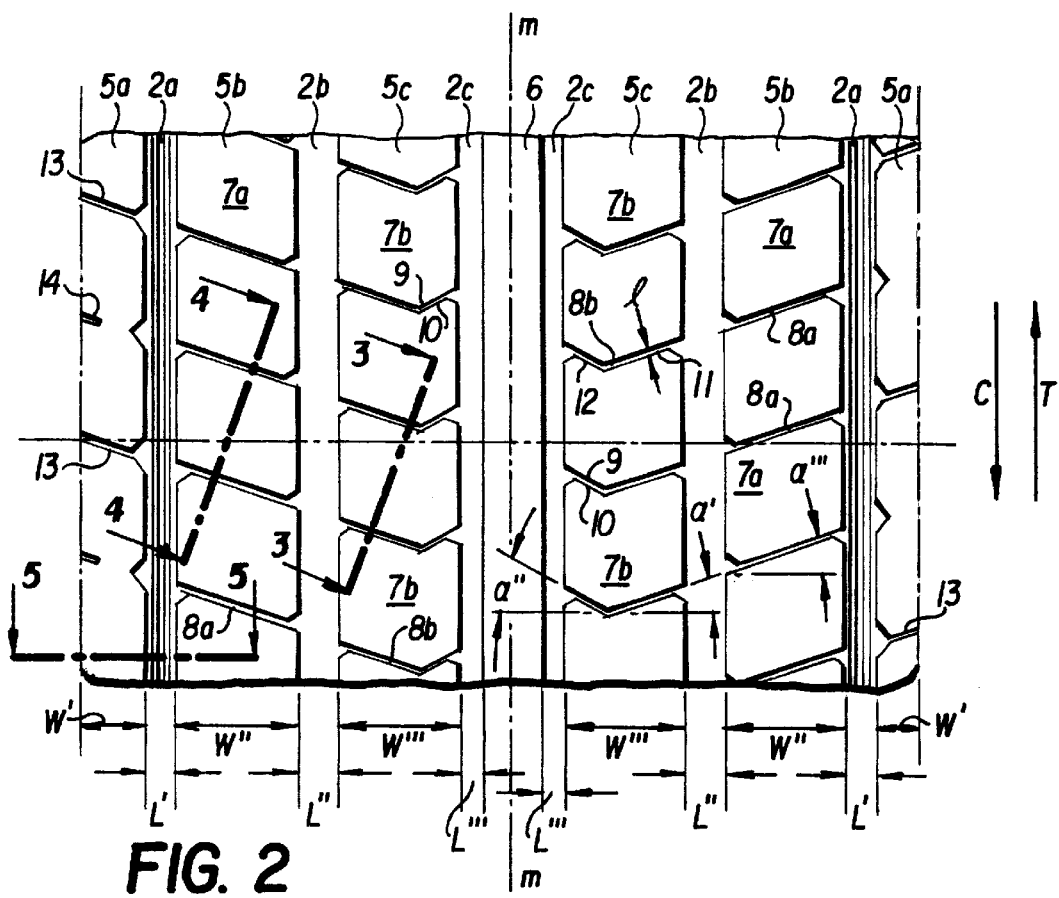
FIG. 2 is a plan view of a circumferential portion of the tire tread as shown in FIG. 1.

As clearly shown in FIG. 2, the intermediate ribs 5b and center ribs 5c have widths W' and W''' substantially of the same value, preferably corresponding to 26 mm and in any case included between ¹⁄₁₁ and ⅙ of the overall width of the tread band 1.

In turn, the shoulder ribs 5a have a width W' substantially equal to 42 mm and preferably greater than the width of each one of the intermediate and center ribs 5b and 5c. The central scooped portion 6 is 13 mm wide and in any case its width preferably should be lower than the width of each one of the intermediate and center ribs 5b and 5c. It should be noted that in FIG. 2 the width W' of the shoulder ribs 5a is foreshortened and therefore appears to be disproportionally narrower than would be true in a developed plan view.

The intermediate and center ribs 5b and 5c are each divided into a plurality of intermediate and center blocks, 7a and 7b respectively, defined by intermediate and center transverse cuts 8a and 8b which preferably substantially have the same depth as the circumferential grooves 2a, 2b and 2c and whose width "l" corresponds to 0.6 mm and at all events is smaller than 1 mm.

In accordance with the present invention, the intermediate and center cuts 8a and 8b are so shaped and disposed that in the axial extension of the tread band 1 several operatively differentiated areas are defined which are designed to perform their functions selectively depending on the rolling direction imposed on the tire. In greater detail, the center cuts 8b are shaped so as to define a directional circumferential area "A", (see FIG. 1) confined between the intermediate grooves 2b, in which the center blocks 7b lend themselves to link up one after the other by effect of elastic deformations induced therein by the reactions transmitted from the ground when the tread band 1 rotates according to a predetermined directional rolling direction marked by arrow "C" (FIG. 2).

To this end, the center cuts 8b are so shaped that in each center block 7b there is defined, at circumferentially opposite positions, a cusp-shaped end portion 9 directed in the above directional rolling direction "C" and a hollow-shaped end portion 10 the shape of which matches that of the cusp-shaped end portion 9 and which is immediately followed by the cusp-shaped portion of the subsequent center block 7b.

To this end, each center cut 8b is essentially defined by first and second consecutive stretches 11, 12 extending obliquely according to respectively opposite orientations relative to the circumferential direction of the tread band 1.

Preferentially, the first and second stretches 11, 12 of each cut 8b form with the circumferential direction of the tread band 1, angles of inclination ' and ''' of 20° and 30° respectively, and in any event preferably in the range of 10° to 30° and 15° to 45°, respectively. The junction point of the first and second stretches 11, 12 is preferably offset relative to the center line of the transverse extension of the corresponding center rib 5c, moving close to the equatorial plane m—m. In greater detail, the distance between the junction point between the first and second stretches 11, 12 and the circumferential edge of the corresponding center rib 5c is preferably between ¼ and ¾ of the overall width W''' of the center rib itself.

In turn, the intermediate cuts 8a are so shaped and arranged that they define two tractive areas "B" (FIG. 1), included in the gap confined between each of the intermediate grooves 2b and the corresponding side edge 1a of the tread band 1, in which at least the intermediate blocks 7a mutually diverge due to the effect of the elastic deformations induced by the reactions transmitted from the ground when the tread band 1 rotates in a tractive rolling direction "T" (FIG. 2) which is contrary to directional rolling direction "C.".

To this end, the intermediate transverse cuts 8a are directed obliquely to the circumferential extension direction of the tread band, concordant with the orientation of the adjacent first stretches 11 of the center cuts 8b, so that a substantially rhomboidal configuration is imparted to the intermediate blocks 7a. More particularly, each of the intermediate cuts 8a is provided to form, with the circumferential extension direction, an angle ''' between 10° and 35° and, in a preferred embodiment, to be in alignment with an imaginary extension of the adjacent stretch of one of the center cuts 8b.

The circumferential distribution pitch of the intermediate and center cuts 8a and 8b preferably corresponds to 0.8% of the circumferential extension of the tire measured at the equatorial plane m—m, and in any event between 0.6% and 1.1% of said circumferential extension.

Preferentially, each of the shoulder ribs 5a is crossed by surface sipes 13 respectively in alignment with an imaginary extension of the intermediate cuts 8a, at the rate of one sipe 13 for every two intermediate cuts 8a.

Such sipes preferably have a normal depth of 2 mm and that depth increases at a narrow central area of the longitudinal extension thereof, although it never exceeds 5 mm. A series of dead end grooves 14 may be alternated with the sipes 13 and they are oriented parallel to said sipes and in the example shown they are 5 mm deep; in any event their depth must not exceed that of sipes 13.

In addition, in accordance with a preferred feature of the invention, the intermediate 8a and center 8b transverse cuts do not extend radially into the thickness of the tread band 1, but they are oriented obliquely in the thickness of the corresponding ribs 5b, 5c, thereby forming a given angle of incidence β' preferably of 5° and in any event between 3° and 10°, relative to a direction "N" normal to the external surface of the tread band 1.

Figure 3:
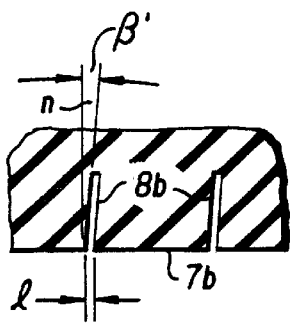
FIG. 3 is a partial sectional view taken along line III—III in FIG. 2.
Figure 4:
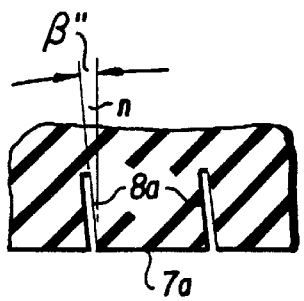
FIG. 4 is a partial sectional view taken along line IV—IV in FIG. 2.

Preferentially, as shown in FIG. 3, the angle of incidence β' formed by each of the center cuts 8b is inclined towards the inside of the corresponding block 7b, in the cusp-shaped portion 9, so as to substantially form an undercut close to the cusp-shaped end portion itself. It is also preferred for the angle of incidence β" formed by the intermediate cuts 8a (FIG. 4) to be correspondingly opposite to that formed by the center cuts 8b.

Advantageously, the opposite incidence given to the intermediate cuts 8a and center cuts 8b further increases the effects achieved by the tread band 1 in terms of directional and tractive capabilities when the tire with which it is associated is used on a traction or driving axle or on a driven axle, respectively.

For better clarifying the different operating features selectively achieved by the tread band of this invention, depending on the direction of rotation imposed on the tire, it is useful to note that the reactions transmitted from the ground to the tread band at the ground-contacting area during running exhibit respectively opposite directions depending on whether the tire is mounted to a driven axle and therefore driven in rotation by effect of the contact with the ground, or mounted to a traction axle and therefore submitted to a torque applied to the tire around its axis of rotation.

More particularly, it has been found that the reactions induced by the ground with reference to the tire mounted to a driven axle tend to cause the blocks to move close to each other at the ground-contacting area, whereas the tangential forces initialized in the case of a tire mounted to the traction axle tend to cause a mutual divarication of the blocks.

The foregoing being stated, it will be noted that when mounted to the driven axle, since the tread band 1 is caused to rotate in the direction indicated by arrow "C" in FIG. 2, each of the center blocks 7b enters the ground-contacting area before the corresponding intermediate block 7a (which are aligned therewith in an imaginary extension of the transverse cuts 8a). Due to the mutual approaching of the blocks at the ground-contacting area the cusp-shaped portion 9 of each of the center blocks 7b fits into the hollow-shaped portion 10 of the contiguous block, thereby causing a mutual self-locking of the blocks in the transverse direction. As a result, the center ribs 5c are stiffened and, also in cooperation with the central scooped-out portion 6, they achieve exceptional directional and drive stability qualities, as well as wear evenness, due to the reduced or negligible mobility of the blocks at the ground-contacting area. The above advantageous effects are increased by the fact that the elastic deformation undergone by the center blocks 7b under the reaction of the ground will tend to close the center cuts 8b, so that an advantageous increase in the contact pressure of the blocks on the ground is achieved and, as a result, a further reduction in the mobility of same.

When used on the traction axle, on the contrary, the tread band 1 is caused to rotate in the tractive direction identified by arrow "T" and the first blocks entering the ground-contacting area are the intermediate blocks 7a. As a result the tractive action at the beginning of the ground-contacting area is progressively generated from the areas closer to the side edges 1a of the tread band towards the equatorial plane m—m. This situation is very advantageous in terms of tractive action, in that the areas close to the side edges, occupied by the shoulder ribs 5a and intermediate ribs 5b respectively, appear to be those where the greatest contact pressure of the tire on the ground-contacting area occurs, whereas the specific inclination of the cuts promotes the mutual divarication of the intermediate blocks 7a and involves opening of the intermediate cuts 8a, to the advantage of the tractive action, so as to ensure an excellent grip even on wet road-beds or road-beds covered with snow.

At the same time, the reactions induced on the center blocks 7b will tend to reduce the angle of incidence β' of the corresponding center cuts 8b, thereby giving rise to an advantageous reduction in the contact pressure of the blocks on the ground capable of compensating for the wear effects that otherwise would result from the greater mobility exhibited by the center blocks 7b under these running conditions.

It will be also noted that the important absence of blocks at the shoulder ribs 5a is capable of imparting an excellent side stability to the tire even when used as a traction tire. This effect is increased by the particular configuration in section of the shoulder grooves 2a that, thanks to the presence of the internal portion 4 of reduced width, prevent an excessive side movement of the intermediate blocks 7a. The cross-sectional configuration of the shoulder grooves 2a is also adapted to facilitate the ejection of stones and debris that may become wedged in the shoulder grooves.

From the foregoing it is apparent that the invention achieves the surprising result of enabling all the tires for a complete medium/heavy duty motor-vehicle to be of a single type of tire, by adopting the mere expedient of giving the tires mounted on the driving axle a direction of rotation contrary to that of the tires mounted on the driven axle, so as to eliminate the non-negligible problems connected in the known art with the management of different types of tires for a single motor-vehicle.

In this connection it is pointed out the fact that the tread band according to the present invention is capable of reaching marked traction capability qualities, which are usually required for use in driving wheels, in spite of the absence of transverse grooves of important width, which are on the contrary inevitably adopted in the known art for achieving the desired traction capability qualities. In this connection practical comparison tests carried out by the applicant have proved that the tread band in question exhibits traction capability qualities comparable with, and maybe even higher than, those achieved with usual tires of the tractive type, even when running on road-beds covered with snow.

The table below shows the results of traction capability tests conducted on compact snow and fresh snow respectively, with identical industrial vehicles the tractive axles of which are respectively equipped with the following tires:

(1) Tractive tire provided with blocks, presently produced by the assignee
(2) Tractive tire provided with blocks, manufactured by the best competitive companies
(3) Winter tire presently produced by assignee
(4) Universal tires, according to the invention.

The reproduced data measure the percent skid of the above tires under the different use conditions.

| | Tires | | | |
|---|---|---|---|---|
| | (1) | (2) | (3) | (4) |
| ON COMPACT SNOW | 22% | 20% | 18.5% | 30% |
| ON FRESH SNOW | 33% | 32% | 32% | 31% |

It will be noted that on compact snow the inventive tire loses some percent points with respect to the comparative tires, of the specific tractive type, whereas its behavior is substantially of same level on fresh snow, and this is achieved by virtue of the type of grooves adopted.

In addition, the invention facilitates the qualities of high directional control and side stability, which are necessarily required when the tires are to be mounted on driving axles, to be stressed. In this case too, practical comparative tests have proved that the tires provided with the tread band in reference are of the same level as the best tires of the "furrowed" type.

The table below shows the results of behavior tests conducted with the same motor-vehicle equipped with the pair of tires presently produced by the applicant and the tires according to the invention identified as above:

| (1) | Traditional directional tires | on the driven axle |
|---|---|---|
|   | Usual tractive tires provided with blocks | on the drive axle |
| (2) | Tires according to the invention | on the driven axle |
|   | Tires according to the invention | on the drive axle |

The data reproduces a subjective evaluation expressed by an inspector for the different features considered.

| | | EQUIPMENT | |
|---|---|---|---|
| | | (1) | (2) |
| RUNNING: | Directional control stability | | |
| | on highway roads | 6.5 | 6.0 |
| | on undulating roads | 6.0 | 5.5 |
| DRIVE: | Quickness of response | 6.0 | 5.0 |
| | Graduality | 6.0 | 5.0 |
| | Centering on a bend | 6.0 | 5.0 |
| | SIDE STABILITY | | |
| | Compliance | 5.5 | 6.0 |
| | Controllability | 5.0 | 5.0 |
| | Gelatine effect | 5.5 | 6.5 |

It will be noted that the inventive tire is lower at the items under "drive", particularly referring to its behavior on the front axle (directional control capability), whereas it is at the same level or higher as regards side stability. In conclusion, the tires of the invention solve the problems connected with the use of different tires on the driven and driving axles without being obliged to renounce the best behavior qualities offered by traditional tires.

Under all use situations, in addition, excellent qualities of high abrasion resistance and uneven wear resistance, as well as good road-holding on a wet road-bed are maintained, thanks to the efficient evacuation of water carried out by the wide circumferential grooves 2a, 2b, 2c.

It will be also recognized that, thanks to the absence of transverse grooves of marked width, the subject tread band is very noise-free and rolls smoothly and is adapted to meet the most recent requirements tending to limit fuel consumption and sound pollution.

In this connection, practical comparative tests carried out by phonometrically detecting, at a predetermined point, the noise emitted on passing of a motor-vehicle riding at high speed with the engine switched off, have proved that the noise emitted from the subject tread band can be compared to that of the traditional type patterns and is greatly lower (1 to 4 dB) than that of usual tires of the traction or driving type including rib-block composite patterns.

Many modifications and variations may be made to the invention as conceived, all of them falling within the scope of the invention as defined by the appended claims.

What is claimed is:

1. A method for using tires on a medium/heavy duty vehicle comprising driven and tractive axles, comprising the steps of:

mounting a first tire to the driven axle, the driven axle being an axle for submitting the first tire to a driven rotation direction by effect of contact of the first tire with the ground;

mounting a second tire to the tractive axle, the tractive axle being an axle for submitting the second tire to a tractive rotation direction by effect of a tractive torque;

wherein said first tire and said second tire are of identical construction and said first tire and said second tire each comprise:

a tread having side edges;

at least one pair of circumferential shoulder ribs positioned between respective side edges of said tread and respective circumferential shoulder grooves axially spaced apart from the side edges;

at least one pair of intermediate circumferential ribs respectively positioned between said shoulder grooves and corresponding intermediate circumferential grooves axially spaced apart from said shoulder grooves;

at least one circumferentially extending center rib positioned between said intermediate grooves, each of said intermediate and center ribs being divided into a plurality of respective intermediate and center blocks, circumferentially respectively defined by intermediate and central transverse cuts, the central transverse cuts defining, in the axial width of the tread, at least one directional circumferential area positioned between the intermediate grooves, in which said center blocks are positioned and shaped to be linked up one after the other by effect of elastic deformations induced therein by the reactions transmitted from the ground when the tread rotates in said first driven rotation direction, wherein each center block has a cusp-shaped end portion, and a hollow-shaped end portion, at a circumferentially opposite position, the shape of the hollow-shaped end portion matches the cusp-shaped end portion of an adjacent center block, said intermediate cuts defining, at lateral opposite positions relative to said directional circumferential area, at least two tractive circumferential areas in which when the tire rotates in said second tractive rotation direction at least the intermediate blocks mutually diverge by effect of the elastic deformations induced by the reactions transmitted from the ground, wherein each of the intermediate blocks has a substantially rhomboidal configuration imparted by said intermediate cuts, obliquely directed to the circumferential direction of the tire, wherein the first tire is mounted on the driven axle with the cusp-shaped portion facing the driven rotation direction and the second tire is mounted on the tractive axle such that the second tire is circumferentially reversed with respect to the first tire.

2. The method according to claim 1, comprising the step of reversing circumferentially said first tire before its mounting on the tractive axle.

3. The method according to claim 1, comprising the step of reversing circumferentially said second tire before its mounting on the driven axle.

4. The method according to claim 1, wherein said respective intermediate and transverse cuts have first and second opposed ends, said first end being open at a surface of the tread, said second end being a bottom of the cut, said respective intermediate and transverse cuts having constant width (l) from said first end to said second end.

5. A medium/heavy duty vehicle comprising:

driven and tractive axles;

tires mounted respectively to the axles, the driven axle being an axle for respectively submitting each tire mounted to the driven axle to a driven rotation direction by effect of contact of the respective tire with the ground, the tractive axle being an axle for respectively submitting each tire mounted to the tractive axle to a traction rotation direction by effect of a tractive torque, each tire mounted to the driven axle and each tire mounted to the tractive axle being of identical construction, each tire comprising:

a tread having side edges;

at least one pair of circumferential shoulder ribs positioned between respective side edges of said tread and respective circumferential shoulder grooves axially spaced apart from the side edges;

at least one pair of intermediate circumferential ribs respectively positioned between said shoulder grooves and corresponding intermediate circumferential grooves axially spaced apart from said shoulder grooves;

at least one circumferentially extending center rib positioned between said intermediate grooves, each of said intermediate and center ribs being divided into a plurality of respective intermediate and center blocks, circumferentially respectively defined by intermediate and central transverse cuts, the central transverse cuts defining, in the axial width of the tread, at least one directional circumferential area positioned between the intermediate grooves, in which each center block has a cusp-shaped end portion facing in a circumferential direction, and a hollow shaped end portion, at a circumferentially opposite position, the shape of the hollow-shaped end portion matches the cusp-shaped end portion of an adjacent center block, wherein said center blocks are linked up one after the other by effect of elastic deformations induced therein by the reactions transmitted from the ground when the tread rotates in said driven rotation direction, said intermediate cuts defining, at lateral opposite positions relative to said directional circumferential area, at least two tractive circumferential areas in which each of the intermediate blocks has a substantially rhomboidal configuration imparted by said intermediate cuts, obliquely directed to the circumferential direction of the tire, wherein when the tire rotates in said traction rotation direction at least the intermediate blocks mutually diverge by effect of the elastic deformations induced by the reactions transmitted from the ground, wherein said cusp-shaped portions of said tires, mounted on the driven axle face the rotation direction and said cusp-shaped portions of said tires, mounted on the tractive axle, face opposite the rotation direction.

6. The vehicle according to claim 5, in which intermediate and central cuts extend obliquely into the thickness of the corresponding ribs, forming respective angles of incidence relative to a direction normal to the outer tread surface.

7. The vehicle according to claim 6, in which the angle of incidence formed by each central cut is oriented so as to substantially undercut the cusp-shaped end portion of the corresponding center block.

8. The vehicle according to claim 7, in which the angle of incidence formed by the intermediate cuts is opposite to the angle of incidence formed by the central cuts.

9. The vehicle according to claim 8, in which each of the angles of incidence has a value between 3° and 10°.

10. The vehicle according to claim 5, wherein said respective intermediate and transverse cuts have first and second opposed ends, said first end being open at a surface of the tread, said second end being a bottom of the cut, said respective intermediate and transverse cuts having constant width (l) from said first end to said second end.

11. A tire for use on a driven or tractive axle of a medium/heavy duty vehicle comprising:

a tread having side edges;

at least one pair of circumferential shoulder ribs positioned between respective side edges of said tread and respective circumferential shoulder grooves axially spaced apart from the side edges;

at least one pair of intermediate circumferential ribs respectively positioned between said shoulder grooves and corresponding intermediate circumferential orooves axially spaced apart from said shoulder grooves;

at least one circumferentially extending center rib positioned between said intermediate grooves, each of said intermediate and center ribs being divided into a plurality of respective intermediate and center blocks, circumferentially respectively defined by intermediate and central transverse cuts, the central transverse cuts defining, in the axial width of the tread, at least one directional circumferential area positioned between the intermediate grooves, in which each center block has a cusp-shaped end portion, and a hollow-shaped end portion, at a circumferentially opposite position, the shape of the hollow-shaped end portion matches the cusp-shaped end portion of an adjacent center block, wherein said center blocks are linked up one after the other by effect of elastic deformations induced therein by the reactions transmitted from the ground when the tread rotates in a driven rotation direction, said intermediate cuts defining, at lateral opposite positions relative to said directional circumferential area, at least two tractive circumferential areas in which each of the intermediate blocks has a substantially rhomboidal configuration imparted by said cuts, obliquely directed to the circumferential direction of the tire, in which each of the intermediate cuts is positioned as an imaginary rectilinear extension of an adjacent stretch of one of the center cuts, wherein when the tire rotates in a tractive rotation direction at least the intermediate blocks mutually diverge by effect of the elastic deformations induced by the reactions transmitted from the ground, said tire being suitable for mounting on a driven axle with said cusp-shaped portion facing the traction rotation direction or on a tractive axle wherein the tire is circumferentially reversed with respect to the mounting on the driven axle, wherein the shoulder ribs have surface sipes, respectively in alignment with an imaginary extension of one of every two intermediate cuts defining a respective intermediate block, at the rate of one sipe for every two intermediate cuts, said surface sipes having a depth of not greater than 5 mm.

12. A tire for use on a driven or tractive axle of a medium/heavy duty vehicle comprising:

a tread having side edges;

at least one pair of circumferential shoulder ribs positioned between respective side edges of said tread and respective circumferential shoulder grooves axially spaced apart from the side edges;

at least one pair of intermediate circumferential ribs respectively positioned between said shoulder grooves and corresponding intermediate circumferential grooves axially spaced apart from said shoulder grooves;

at least one circumferentially extending center rib positioned between said intermediate grooves, each of said intermediate and center ribs being divided into a plurality of respective intermediate and center blocks, circumferentially respectively defined by intermediate and central transverse cuts, the central transverse cuts defining, in the axial width of the tread, at least one directional circumferential area positioned between the intermediate grooves, in which each center block has a cusp-shaped end portion, and a hollow-shaped end portion, at a circumferentially opposite position, the shape of the hollow-shaped end portion matches the cusp-shaped end portion of an adjacent center block, wherein said center blocks are linked up one after the other by effect of elastic deformations induced therein by the reactions transmitted from the ground when the tread rotates in a driven rotation direction, said intermediate cuts defining, at lateral opposite positions relative to said directional circumferential area, at least two tractive circumferential areas in which each of the intermediate blocks has a substantially rhomboidal configuration imparted by said cuts, obliquely directed to the circumferential direction of the tire, in which each of the intermediate cuts is positioned as an imaginary rectilinear extension of an adjacent stretch of one of the center cuts, wherein when the tire rotates in a tractive rotation direction at least the intermediate blocks mutually diverge by effect of the elastic deformations induced by the reactions transmitted from the ground, said tire being suitable for mounting on a driven axle with said cusp-shaped portion facing the traction rotation direction or on a tractive axle wherein the tire is circumferentially reversed with respect to the mounting on the driven axle wherein said central cuts have first and second consecutive stretches to form said cusp-shaped end portion and said hollow-shaped end portion of each center block, wherein said first stretch has a different length than said second stretch and said first stretch forms a different angle with a phantom line which passes through a point of intersection of the two consecutive stretches in a direction transverse to a circumference of the tire.

13. The tire according to claim 12, in which each central cut has a first stretch and a second stretch, wherein said second stretch extends, relative to the circumferential direction, an angle of inclination between 15° and 40°.

14. The tire according to claim 12, said intermediate and transverse cuts being of a width less than 1 mm.

15. The tire according to claim 12, in which first stretches of the central cuts and the intermediate cuts form an angle of inclination between 10 and 35° to the circumferential direction.

16. The tire according to claim 12, in which each of said shoulder grooves and intermediate grooves has a depth between 11 mm and 18 mm.

17. The tire according to claim 12, in which each of said shoulder and intermediate grooves is 2 mm to 15 mm wide on the external surface of the tread.

18. The tire according to claim 17, in which each of said shoulder grooves has an external portion opening onto the external tread surface with a width between 5 mm and 10 mm wide and has an internal portion having a width less than 2 mm and a depth of 1/8 to 2/3 of the overall depth of the shoulder groove.

19. The tire according to claim 18, in which each of said intermediate grooves has a width greater than the width of the shoulder grooves.

20. The tire according to claim 12, in which intermediate and central cuts extend obliquely into the thickness of the corresponding ribs, forming respective angles of incidence relative to a direction normal to the outer tread surface.

21. The tire according to claim 20, in which the angle of incidence formed by each central cut is oriented so as to substantially undercut the cusp-shaped end portion of the corresponding center block.

22. The tire according to claim 21, in which the angle of incidence formed by the intermediate cuts is opposite to the angle of incidence formed by the central cuts.

23. The tire according to claim 20, in which each of the angles of incidence has a value between 3° and 10°.

24. The tire according to claim 12, in which each of said central and intermediate cuts has a width between 0.3 and 1 mm.

25. The tire according to claim 12, in which each of said intermediate and central cuts has a depth substantially equal to the depth of the adjacent circumferential grooves.

26. The tire according to claim 12, in which each shoulder rib has surface sipes positioned to be aligned in an imaginary extension of an adjacent intermediate cut and having a depth not greater than 5 mm.

27. The tire according to claim 12, in which each of said central and intermediate cuts has a width between 0.3 and 1.5 mm.

28. The tire according to claim 12, wherein said respective intermediate and transverse cuts have first and second opposed ends, said first end being open at a surface of the tread, said second end being a bottom of the cut, said respective intermediate and transverse cuts having constant width (l) from said first end to said second end.

* * * * *